United States Patent
Uy et al.

(10) Patent No.: US 12,457,484 B2
(45) Date of Patent: Oct. 28, 2025

(54) METHOD AND SYSTEM FOR THIRD PARTY SUBSCRIPTION MANAGEMENT OF END DEVICE PROFILES

(71) Applicant: Verizon Patent and Licensing Inc., Basking Ridge, NJ (US)

(72) Inventors: Warren Hojilla Uy, Randolph, NJ (US); Thomas W. McArtney, Long Valley, NJ (US); Taussif Khan, Martinsville, NJ (US); Alexandre De Melo, Basking Ridge, NJ (US); Mary Williams, Miltona, MN (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 630 days.

(21) Appl. No.: 17/732,917

(22) Filed: Apr. 29, 2022

(65) Prior Publication Data

US 2023/0354008 A1    Nov. 2, 2023

(51) Int. Cl.
*H04W 8/18* (2009.01)
*G06Q 20/32* (2012.01)
*G06Q 20/34* (2012.01)

(52) U.S. Cl.
CPC ........ *H04W 8/183* (2013.01); *G06Q 20/3229* (2013.01); *G06Q 20/347* (2013.01)

(58) Field of Classification Search
CPC ....... H04W 88/06; H04W 12/06; H04W 4/12; H04W 84/12; H04W 84/04; H04W 28/02; H04W 48/16; H04W 8/20; H04W 48/14; H04W 4/50; H04W 4/24; H04W 8/02; H04W 12/08
See application file for complete search history.

(56) References Cited

U.S. PATENT DOCUMENTS

| | | | |
|---|---|---|---|
| 11,956,848 B2 * | 4/2024 | Mecum | H04W 8/24 |
| 2021/0153009 A1 * | 5/2021 | Patil | H04W 12/037 |
| 2022/0116763 A1 * | 4/2022 | Bouskila | H04W 8/183 |
| 2023/0262444 A1 * | 8/2023 | Khan | H04W 60/04 455/558 |

FOREIGN PATENT DOCUMENTS

| | | | |
|---|---|---|---|
| KR | 20090081719 A | * | 7/2009 |
| WO | WO2022191241 | * | 3/2022 |

* cited by examiner

*Primary Examiner* — Khalid W Shaheed

(57) ABSTRACT

A method, a device, and a non-transitory storage medium are described in which a third party subscription management of end device profiles service is provided. The service may include obtaining a profile for a card of an end device from a third party device in which the profile includes a temporary element. For example, the temporary element may be a temporary keyset or a temporary USIM. During initial connectivity and activation with a core network, the card logic may obtain and update the profile with a permanent element for registration and activation procedures with the core network. In this way, security exposure with a third party device relating to a profile may be eliminated or minimized.

20 Claims, 7 Drawing Sheets

METHOD AND SYSTEM FOR THIRD PARTY SUBSCRIPTION MANAGEMENT OF END DEVICE PROFILES

BACKGROUND

Service providers, network providers, and other types of entities may manage the allocation and assignment of subscriber identification module (SIM) cards and/or other types of cards to end devices for use in accessing various networks and application services.

DETAILED DESCRIPTION

Figure 1:
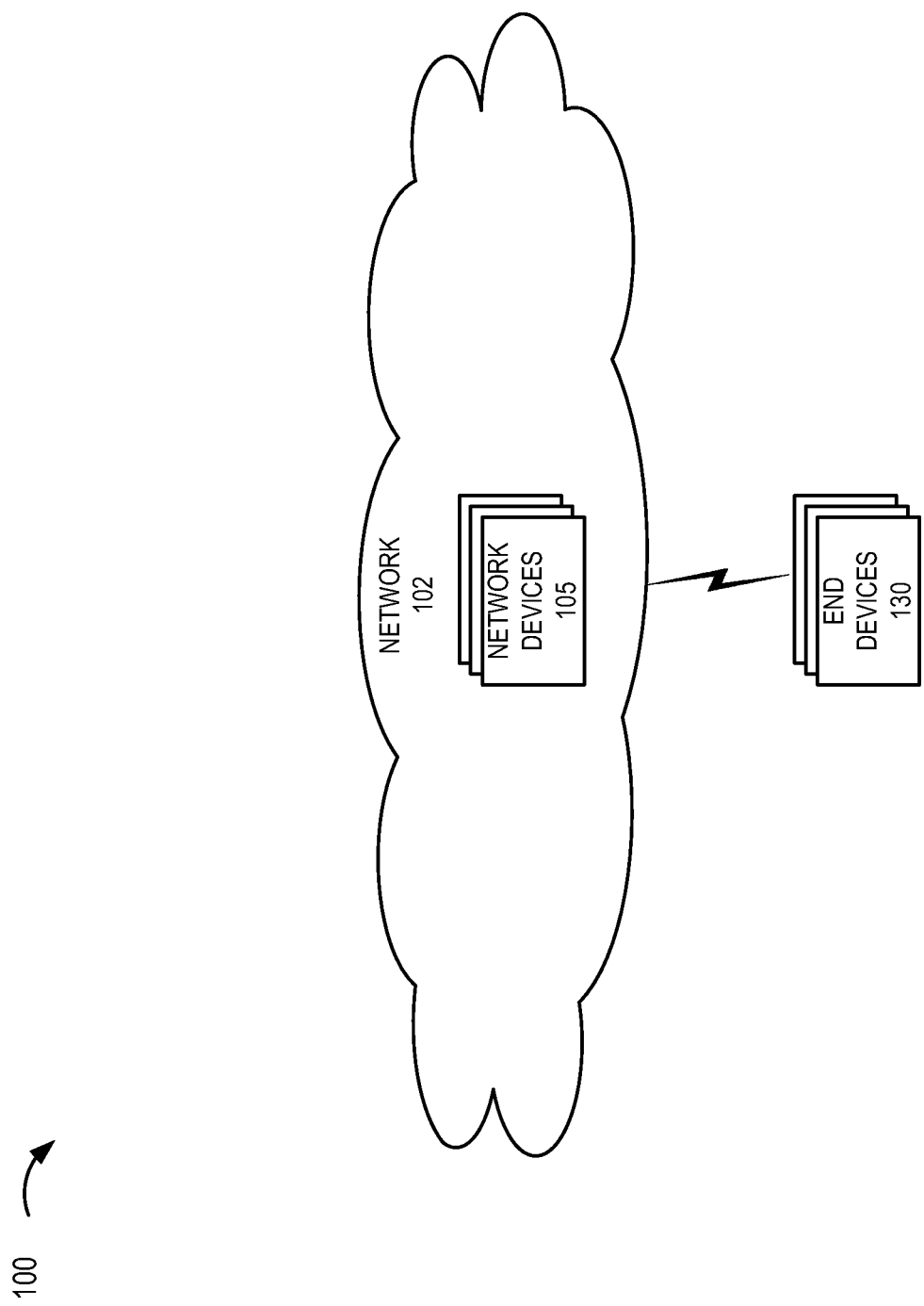
FIG. 1 is a diagram illustrating an exemplary environment in which an exemplary embodiment of a third party subscription management of end device profiles service may be implemented.

The following detailed description refers to the accompanying drawings. The same reference numbers in different drawings may identify the same or similar elements. Also, the following detailed description does not limit the invention.

A service provider, a network provider, a network operator, a wireless carrier, or another type of entity may have to manage various aspects of end devices that support the provisioning of wireless access to various networks and application services. For example, the entity may have to acquire, assign, distribute, and/or manage SIMs, embedded SIMS (eSIMs), Universal SIMs (USIMs), Universal Integrated Circuit Cards (UICCs), embedded UICCs (eUICCs), and/or similar types of components that may be used by various types of end devices. A card may relate to a SIM card, an eSIM card/chip, a UICC (e.g., removable, embedded), a secure element (SE), an integrated trusted execution environment (TEE), a chip or the like, various types of data, and an application, software, operating system (OS), and/or other types of executables that may be stored on and executed by the card, for example. As an example, the card may host a profile, which may include subscription data, security authentication and ciphering information, network configuration information (e.g., roaming files/configuration, etc.), and applications and/or algorithms (e.g., encryption, decryption, etc.).

The entity may use a third party system to handle the binding and downloading of profiles to the end devices. The profiles may include, among other things, network keys, credentials, and other sensitive information relating to a network associated with the entity. As a consequence, there are various security exposures in relation to the profiles and use of the third party system that could negatively impact the end devices and/or the network.

According to exemplary embodiments, a third party subscription management of end device profiles service is described. According to an exemplary embodiment, the third party subscription management of end device profiles service may include the provisioning of temporary elements of end device profiles and the updating, converting, and/or replacing of the temporary elements with permanent elements. For example, according to an exemplary embodiment, the third party subscription management of end device profiles service may include the provisioning of end device profiles, which include temporary keysets, on a third party system. The temporary keyset may afford limited connectivity by an end device to a network and subsequent updating of the temporary keyset to a permanent keyset. According to an exemplary embodiment, after the updating, the third party subscription management of end device profiles service may enable the end device to connect to the network and complete an activation process based on the permanent keyset. The end device may also register with the network.

According to another exemplary embodiment, the third party subscription management of end device profiles service may include the provisioning of end device profiles, which include temporary USIMs, on a third party system. The temporary USIM may afford limited connectivity by an end device to a network and subsequent updating of the temporary USIM to a permanent USIM. According to an exemplary embodiment, after the updating, the third party subscription management of end device profiles service may enable the end device to connect to the network and complete an activation process based on the permanent USIM. The end device may also register with the network.

According to yet another exemplary embodiment, the third party subscription management of end device profiles service may include the provisioning of end device profiles, which include temporary USIMs and blank USIMs, on a third party system. The temporary USIM may afford limited connectivity by an end device to a network and subsequent updating of the blank USIM to a permanent USIM. According to an exemplary embodiment, after the updating, the third party subscription management of end device profiles service may enable the end device to connect to the network and complete an activation process based on the permanent USIM. The end device may also register with the network.

In view of the foregoing, the third party subscription management of end device profiles service may significantly reduce or even eliminate security exposures associated with the provisioning of end device profiles on a third party subscription management system. For example, the third party subscription management of end device profiles service may use temporary keyset information, temporary USIMs, or blank USIMs that may allow the end devices to execute an activation process in a manner that protects network information of an entity, such as a network operator, despite the use of a third party subscription management system, as well as maintain a secure environment for the end devices and the network during the activation process and initial connectivity procedure with a network, such as a core network.

FIG. 1 is a diagram illustrating an exemplary environment 100 in which an exemplary embodiment of a third party subscription management of end device profiles service may be implemented. As illustrated, environment 100 include a network 102. Network 102 may include network devices 105. Additionally, as illustrated, environment 100 may include end devices 130 (also referred to individually or generally as end device 130).

The number, type, and arrangement of networks illustrated and described in environment 100 are exemplary. For example, according to other exemplary embodiments, environment 100 may include fewer networks, additional networks, and/or different networks.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into various types of network architectures (e.g., Software Defined Networking (SDN), virtual, logical, network slice, etc.). The number, the type, and the arrangement of network devices illustrated and described are exemplary. For purposes of description, an end device is not considered a network device.

Environment 100 includes communication links between the network devices and between end devices and a network. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated and described in environment 100 are exemplary.

Environment 100 may include various planes of communication including, for example, a control plane, a user plane, a service plane, and/or a network management plane. Environment 100 may include other types of planes of communication. According to various exemplary implementations, the interface of the network device may be a service-based interface, a reference point-based interface, an Open Radio Access Network (O-RAN) interface, a Fifth Generation (5G) interface, another generation of interface (e.g., 5.5G, Sixth Generation (6G), Seventh Generation (7G), etc.), or some other type of interface (e.g., proprietary, etc.).

Referring to FIG. 1, network 102 may include one or multiple types of networks of one or multiple types of technologies. Network 102 may be implemented to include a cloud network, a private network, a public network, the Internet, a packet data network (PDN), a service provider network, a data center, a radio access network (RAN), a core network, and/or another type of network that may provide access to and may provide a subscription management service. The subscription management service may include the distribution and provisioning of cards to end devices 130. The subscription management service may include an exemplary embodiment of the third party subscription management of end device profiles service, as described herein.

According to an exemplary embodiment, network 102 may be implemented using one or multiple technologies including, for example, network function virtualization (NFV), SDN, cloud computing, Infrastructure-as-a-Service (IaaS), Platform-as-a-Service (PaaS), Software-as-a-Service (SaaS), or another type of network technology.

Depending on the implementation, network 102 may include multiple types of network devices, such as network devices 105. For example, network devices 105 may include a network device that allocates end device profiles to distribution devices. For example, an allocation device may segment the inventory of end device profiles and may allocate the end device profiles to respective distribution devices for provisioning with end devices 130. The allocation device may generate and/or assign an integrated circuit card identifier to each of the cards or profiles.

According to an exemplary embodiment, network devices 105 include a third party distribution device. According to various exemplary embodiments of the third party subscription management of end device profiles service, the third party distribution device may be provisioned with end device profiles that include temporary keysets, end device profiles that include temporary USIMs, or end device profiles that include temporary USIMs and blank USIMs, as described herein. The third party distribution device may include logic that manages the downloading of the end device profiles to end devices 130, as described herein.

Network devices 105 may include an over-the-air (OTA) server or similar functioning network device that facilitates the provisioning and activation of end devices 130, as described herein. For example, according to various exemplary embodiments, the OTA server may provide and/or update end devices 130 with permanent keysets or permanent USIMs, as described herein.

Additionally, network devices 105 may include various network devices of a radio access network. For example, the radio access network may be implemented to include a Fifth Generation (5G) RAN, a future generation RAN (e.g., a 5.5 RAN, a Sixth Generation (6G) RAN, a Seventh Generation (7G) RAN, or a subsequent generation RAN), a centralized-RAN (C-RAN), an Open Radio Access Network (O-RAN), and/or another type of access network (e.g., a Fourth Generation (4G) RAN, a 4.5G RAN, etc.). By way of further example, network devices 105 may include a next generation Node B (gNB), an evolved LTE (eLTE) evolved Node B (eNB), an eNB, a radio network controller (RNC), a remote radio head (RRH), a baseband unit (BBU), a radio unit (RU), a remote radio unit (RRU), a centralized unit (CU), a distributed unit (DU), a 5G ultra-wide band (UWB) node, a future generation wireless access device (e.g., a 6G wireless station, a 7G wireless station, or another generation of wireless station), and/or the like. The network device(s) of the radio access network may support communication and connectivity between end device 130 and other network devices 105 of network 102 and the third party subscription management of end device profiles service, as described herein.

Further, network devices 105 may include network devices of a core network. The core network may include a complementary network of the radio access network. For example, the core network may be implemented to include a 5G core network, an evolved packet core (EPC) of a Long Term Evolution (LTE) network, an LTE-Advanced (LTE-A) network, and/or an LTE-A Pro network, a future generation core network (e.g., a 5.5G, a 6G, a 7G, or another generation of core network), and/or another type of core network. Depending on the implementation of the core network, the core network may include diverse types of network devices, such as a user plane function (UPF), an access and mobility management function (AMF), a session management function (SMF), a unified data management (UDM) device, a unified data repository (UDR), an authentication server function (AUSF), a network slice selection function (NSSF), a network repository function (NRF), a policy control function (PCF), a network exposure function (NEF), a mobility management entity (MME), a packet gateway (PGW), a serving gateway (SGW), a home subscriber server (HSS), an authentication, authorization, and accounting (AAA) server, a policy and charging rules function (PCRF), a policy and charging enforcement function (PCEF), a charging system (CS), and/or another type of network device that may be well-known but not particularly mentioned herein.

According to various exemplary embodiments of the third party subscription management of end device profiles service, the network device(s) of the core network may facilitate the provisioning and activation of the end device profiles/cards associated end device 130 and network 102. For example, the network device(s) may authenticate end device 130, activate logic of end device 130 to provision a permanent keyset, a permanent USIM, or convert a blank USIM to a permanent USIM, as described herein.

End device 130 device may include a device that has communication capabilities and computational capabilities. End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, etc.), a computer, a gaming device, a music device, an Internet of Things (IoT) device, a drone, a smart device, or other type of wireless device (e.g., other type of user equipment (UE)). End device 130 may be configured to execute various types of software (e.g., applications, programs, etc.). The number and the types of software may vary among the end devices 130. According to an exemplary embodiment, end device 130 may operate and connect to network 102 based on a card or chip and an end device profile, as described herein.

End device 130 may support one or multiple radio access technologies (RATs) (e.g., 4G, 5G, and/or future generation RAT) and various portions of the radio spectrum (e.g., multiple radio frequency (RF) bands, multiple carrier frequencies, licensed, unlicensed, millimeter (mm) wave, above mm wave, centimeter (cm) wave, etc.), various levels and genres of network slicing, dual connectivity (DC) service, carrier aggregation (CA) service, and/or other types of connectivity services.

Figure 2:
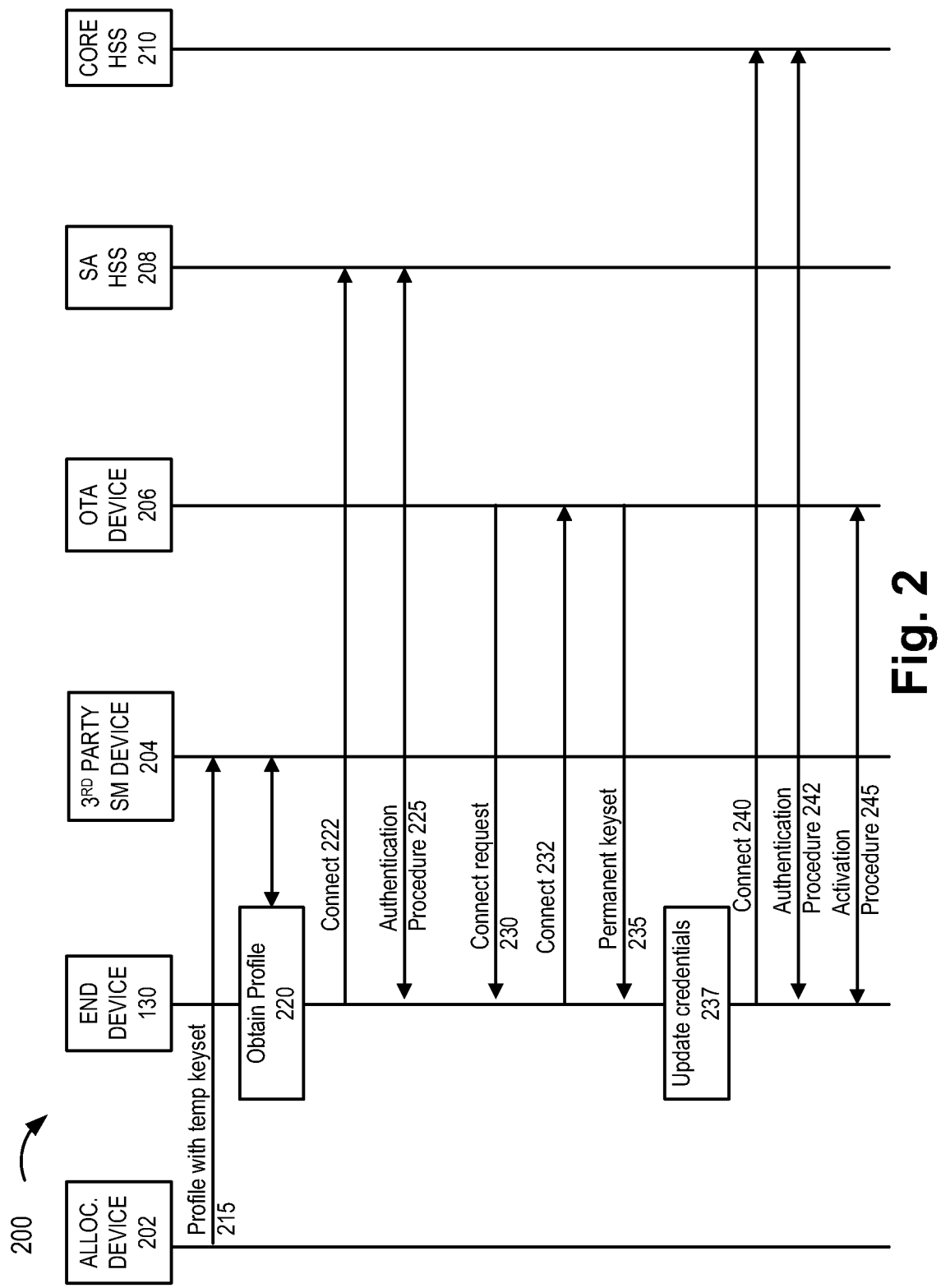
FIG. 2 is a diagram illustrating an exemplary process of an exemplary embodiment of the third party subscription management of end device profiles service.

FIG. 2 is a diagram illustrating an exemplary process of an exemplary embodiment of the third party subscription management of end device profiles service. The exemplary environment, in which an exemplary process 200 may be implemented, may include end device 130, an allocation device 202, a third party subscription management (SM) device 204, an OTA device 206, a self-activation (SA) HSS 208, and a core HSS 210. According to other embodiments, additional, different, and/or fewer network devices may be used to perform an exemplary embodiment of the third party subscription management of end device profiles service.

Allocation device 202 may include a network device which includes logic that provides a function or a service of an exemplary embodiment of the third party subscription management of end device profiles service. For example, allocation device 202 may provision third party subscription management device 204 with end device profiles. The end device profile may include operator subscription data, authentication credentials, and card-based software and/or applications. The end device profile may include a bootstrap profile that affords end device 130 minimal or limited access to network 102 and allows end device 130 to communicate with a provisioning system. According to various exemplary embodiments, the end device profile may include a temporary keyset or a temporary USIM.

Third party subscription management device 204 may include a network device which includes logic that provides a function or a service of an exemplary embodiment of the third party subscription management of end device profiles service. For example, third party subscription management device 204 may facilitate the downloading of suitable end device profiles, as described herein, to end devices 130. For example, third party subscription management device 204 may receive a request from end device 130 for an end device profile. Third party subscription management device 204 may be implemented as a single or a multi-vendor distribution platform system that includes distribution of end device profiles to end devices 130. Third party subscription management device 204 may store and associate network-related information, such as an International Mobile Subscriber Identity (IMSI), subscription permanent identifiers (SUPIs) or the like, with other identifiers (e.g., integrated circuit card identifiers (ICCIDs) or another type of globally unique identifier that identifies each end device profile.

OTA device 206 may include a network device which includes logic that provides a function or a service of an exemplary embodiment of the third party subscription management of end device profiles service. OTA device 206 may include logic that downloads a permanent keyset or a permanent USIM, or updates a blank USIM to a permanent USIM. OTA device 206 may be implemented as an OTA server, such as a SIM OTA server, a device management (DM) server, or another type of card OTA server. OTA device 206 may activate a profile based on a communication from end device 130 indicating that the profile has been successfully installed.

SA HSS 208 may include a network device which includes logic that provides a function or a service of an exemplary embodiment of the third party subscription management of end device profiles service. For example, SA HSS 208 may authenticate and/or authorize end device 130 that may install a profile that includes a temporary element, as described herein. For example, the end device profile may include a temporary keyset, a temporary USIM, or a blank USIM. According to various exemplary embodiments, SA HSS 208 may be implemented to include an HSS, a UDM, a UDR, and/or a similar network device. SA HSS 208 may perform a security procedure based on a keyset associated with end device 130. According to some exemplary embodiments, SA HSS 208 may be implemented as a dedicated HSS, UDM, and/or UDR pertaining to end device 130, card, and/or end device profile activation, unlike core HSS 210.

Core HSS 210 may include a network device which includes logic that provides a function or a service of an exemplary embodiment of the third party subscription management of end device profiles service. For example, core HSS 210 may authenticate and/or authorize end device 130 when end device 130 has an end device profile that includes a permanent keyset, a permanent USIM, or an updated/converted USIM (e.g., updated/converted blank USIM to a permanent USIM). According to various exemplary embodiments, core HSS 210 may be implemented to include an HSS, a UDM, a UDR, and/or a similar network device that may store subscription data relating to end devices 130.

End device 130 may include a device which includes logic that provides a function or a service of an exemplary embodiment of the third party subscription management of end device profiles service. For example, end device 130 may include a physical card, chip, or the like and an end device profile that includes logic that provides a function or a process of an exemplary embodiment of the third party subscription management of end device profiles service. The physical card or chip may include a processor and a memory and/or storage. As an example, end device 130 may be configured to download a profile from third party subscription management device 204. Based on the installation of the profile of the card, according to various exemplary embodiments of the third party subscription management of end device profiles service, the card and the profile may be configured to perform a security procedure with SA HSS 208, core HSS 210, or both, perform an updating procedure of the profile, and perform activation and registration procedures, as described herein.

Referring to FIG. 2 of an exemplary process 200, according to an exemplary embodiment, process 200 may include updating a temporary keyset of the end device profile during an initial connectivity procedure. As illustrated, allocation device 202 may transmit and/or provision a profile, which includes a temporary keyset 215, to/at third party subscription management device 204. End device 130 and/or a card of end device 130 may initiate a download of the profile with third party subscription management device 204 and obtain the profile 220. For example, although not illustrated, end device 130 and/or the card may transmit a request, which may include a request for a profile, and third party subscription management device 204 may select an appropriate profile, and provide a response that includes the profile. The profile may include a temporary keyset. For example, the temporary keyset may include a master key, and parameters and/or constants used by an encryption algorithm or encryption/decryption algorithm. Based on the completion of an installment or enablement of the profile associated with the card of end device 130, the card and the profile (referred to herein as "card logic") may be configured to connect 222 with SA HSS 208. As illustrated, after a connection is established, the card logic and SA HSS 208 may perform an authentication procedure 225. The authentication procedure may be based on the use of the temporary keyset included in the profile.

After successful completion of the authentication procedure 225, OTA device 206 may transmit a connect request 230 to end device 130 that may cause the card logic to establish a connection 232 with OTA device 206. Although not shown, the communication may be based on a communication between SA HSS 208 and OTA device 206 via network provisioning devices. Based on the established connection, OTA device 206 may transmit a permanent keyset 235 to the card logic of end device 130. The card logic may update network credentials 237 (e.g., the temporary keyset) with the permanent keyset and may refresh the card logic. According to some exemplary embodiments, the remaining portion of the profile may not be updated. Thereafter, end device 130 may be configured to connect 240 with the core network (e.g., core HSS 210) and perform an authentication procedure 242. When successful, the card logic of end device 130 may perform an activation procedure 245 with OTA device 206 using the permanent keyset.

Figure 3:
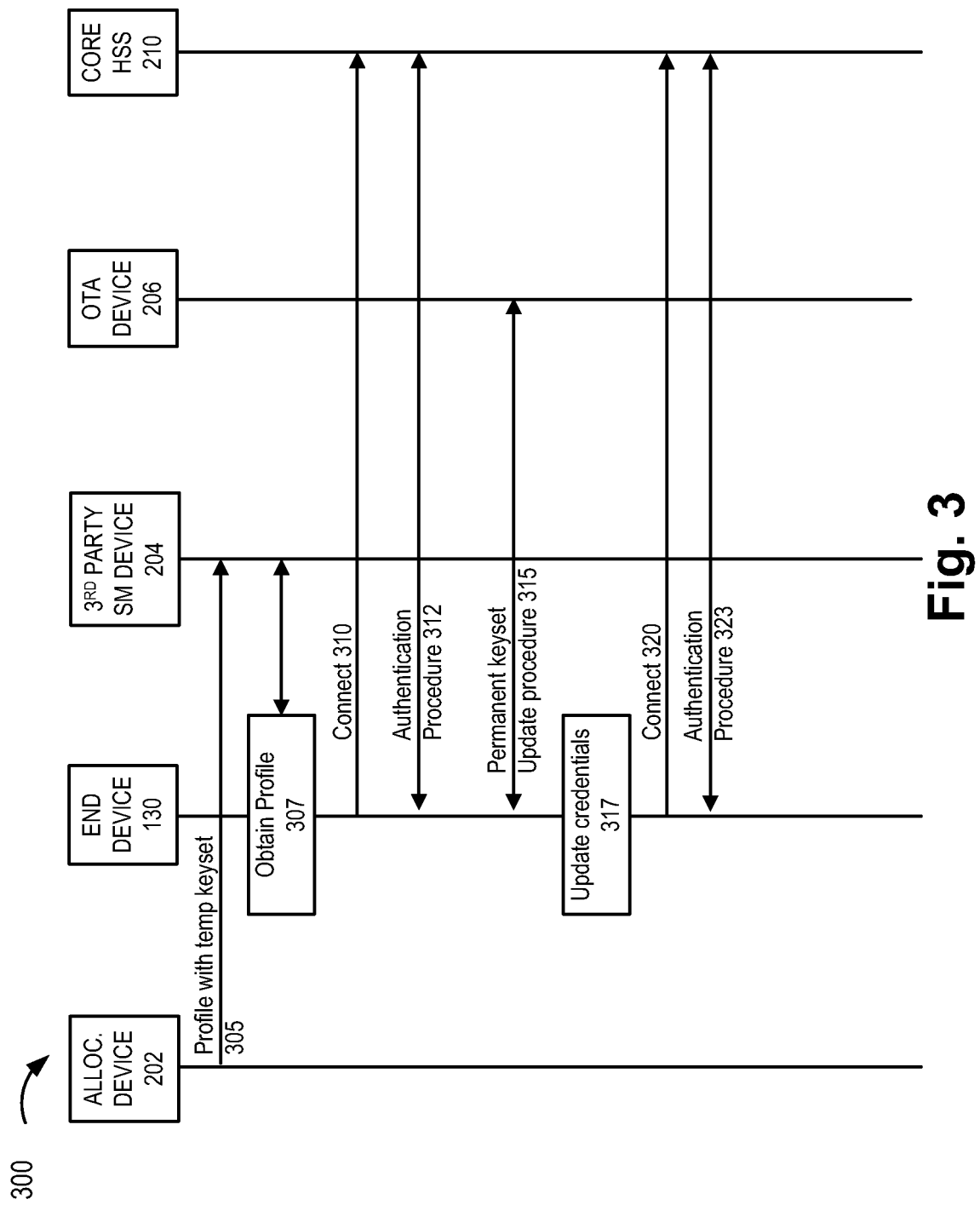
FIG. 3 is a diagram illustrating another exemplary process of an exemplary embodiment of the third party subscription management of end device profiles service.

FIG. 3 is diagram illustrating another exemplary process 300 of an exemplary embodiment of the third party subscription management of end device profiles service. Referring to FIG. 3, process 300 may include updating a temporary keyset of end device 130 during initial connectivity and device/card activation. As illustrated, allocation device 215 may transmit and/or provision a profile, which includes a temporary keyset 305, to/at third party subscription management device 204. End device 130 may initiate a download of the profile with third party subscription management device 204 and obtain the profile 307. For example, although not illustrated, end device 130 may transmit a request, which may include a request for a profile, and third party subscription management device 204 may select an appropriate profile, and provide a response that includes the profile. The profile may include a temporary keyset. Based on the completion of an installment or enablement of the profile associated with a card of end device 130, the card logic may be configured to connect 310 with core HSS 210. As illustrated, after a connection is established, end device 130 and core HSS 210 may perform an authentication procedure 312. The authentication procedure 312 may be based on the use of the temporary keyset.

After successful completion of the authentication procedure 312, OTA device 206 and the card logic of end device 130 may perform a permanent key and update procedure 315. For example, based on an established connection, OTA device 206 may transmit a permanent keyset 315 to the card logic via end device 130 and may perform an activation procedure with the card logic/end device 130. The profile may include logic that updates network credentials 317 with the permanent keyset and may refresh the card logic. According to some exemplary embodiments, the remaining portion of the profile may not be updated. Thereafter, end device 130/card logic may be configured to connect 320 with core network device (e.g., core HSS 210) and perform an authentication procedure 323 based on the permanent keyset. Although not illustrated, similar to process 200, end device 130 and/or the card logic may perform an activation procedure with OTA 206 before or after authentication procedure 323 based on the enablement of the update.

Figure 4:
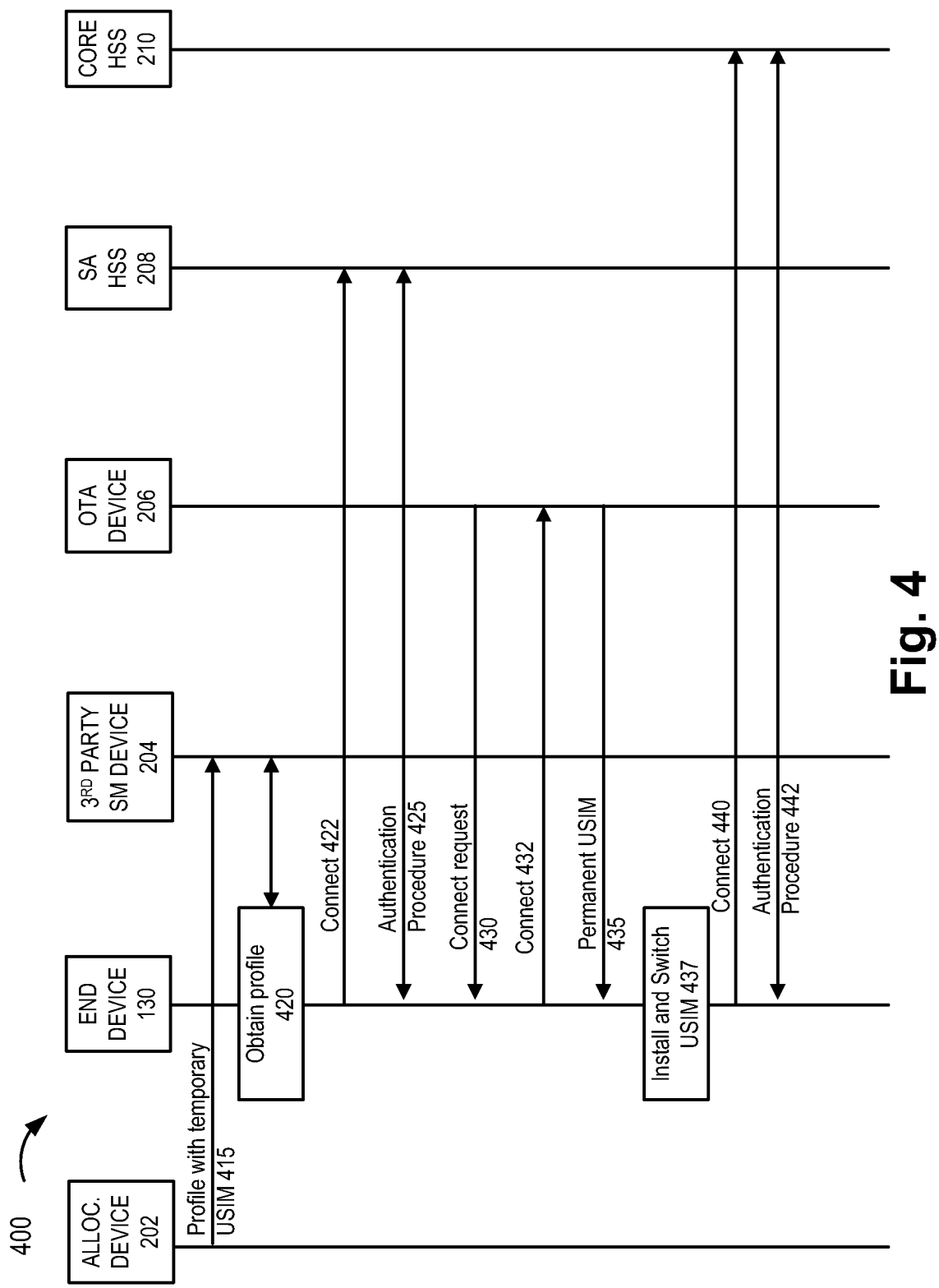
FIG. 4 is a diagram illustrating yet another exemplary process of an exemplary embodiment of the third party subscription management of end device profiles service.

FIG. 4 is diagram illustrating yet another exemplary process 400 of an exemplary embodiment of the third party subscription management of end device profiles service. Referring to FIG. 4, process 400 may include updating a temporary USIM of the end device during initial connectivity and device/card activation. As illustrated, allocation device 202 may transmit and/or provision a profile, which includes a temporary USIM, to/at third party subscription management device 204. The temporary USIM may be implemented as a network access application, for example. According to an exemplary embodiment, the temporary USIM may include a temporary keyset. End device 130 may initiate a download of the profile with third party subscription management device 204 and obtain the profile 420.

Based on the completion of an installment or enablement of the profile, the card logic may be configured to connect 422 with SA HSS 208. As illustrated, after a connection is established, the card logic and SA HSS 208 may perform an authentication procedure 425. The authentication procedure may be based on the use of the temporary USIM and the temporary keyset included in the profile, for example.

After successful completion of the authentication procedure 425, OTA device 206 may transmit a connect request 430 to the card logic via end device 130 that may cause the card logic to establish a connection 432 with OTA device 206. Although not shown, the communication may be based on a communication between SA HSS 208 and OTA device 206 via network provisioning devices. Based on the established connection, OTA device 206 may transmit a permanent USIM and a permanent keyset 435 to the card logic of end device 130. The communication may also include an activation procedure. The card logic may update temporary USIM and temporary keyset with the permanent USIM and the permanent keyset and may switch use of the temporary USIM/keyset to the permanent USIM/keyset 437. According to some exemplary embodiments, the remaining portion of the profile may not be updated or altered. Thereafter, end device 130 may be configured to connect 440 with core network (e.g., core HSS 210) and perform an authentication procedure 442. Although not illustrated, similar to process 200, end device 130 and/or the card logic may perform an activation procedure with OTA 206 before or after authentication procedure 442 based on the enablement of the update.

Figure 5:
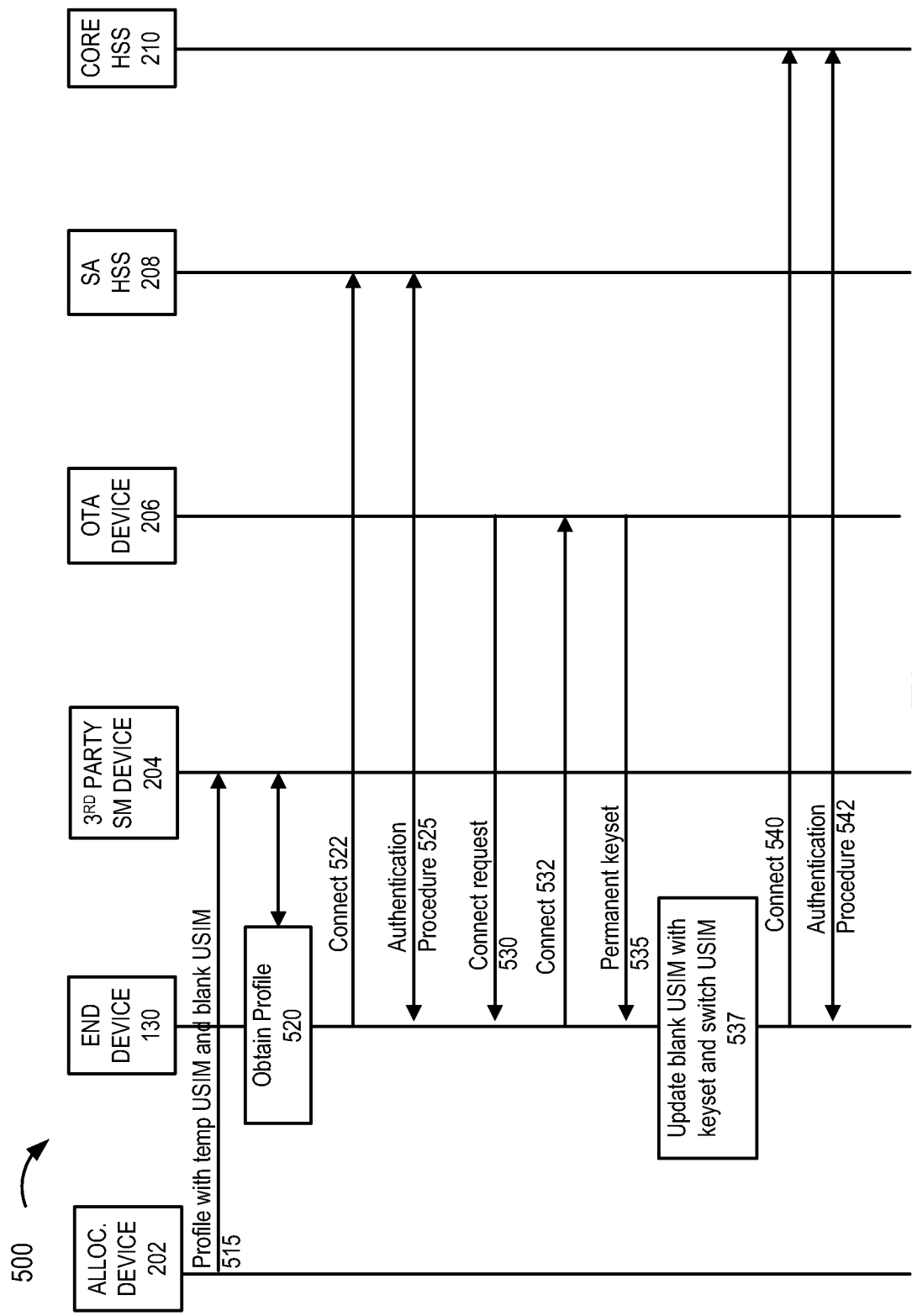
FIG. 5 is a diagram illustrating still another exemplary process of an exemplary embodiment of the third party subscription management of end device profiles service.

FIG. 5 is diagram illustrating still another exemplary process 500 of an exemplary embodiment of the third party subscription management of end device profiles service. Referring to FIG. 5, process 500 may include converting a blank USIM of the end device to a permanent USIM during initial connectivity and device/card activation.

As illustrated, allocation device 202 may transmit and/or provision a profile, which includes a temporary USIM and a blank USIM 515, to/at third party subscription management device 204. The temporary USIM may include a temporary keyset. The blank USIM may not include a keyset. End device 130 may initiate a download of the profile with third party subscription management device 204 and obtain the profile 520. Based on the completion of an installment or enablement of the profile associated with a card of end device 130, the card logic may be configured to connect 522 with SA HSS 208. As illustrated, after a connection is established, the card logic and SA HSS 208 may perform an authentication procedure 525. The authentication procedure may be based on the use of the temporary USIM, for example.

After successful completion of the authentication procedure 525, OTA device 206 may transmit a connect request 530 to the card logic via end device 130 that may cause the card logic to establish a connection 532 with OTA device 206. Although not shown, the communication may be based on a communication between SA HSS 208 and OTA device 206. Based on the established connection, OTA device 206 may transmit a permanent keyset 535 to the card logic of end device 130. This is in contrast to process 400 in which both the USIM (e.g., network access application) and the keyset are downloaded. The communication may also include an activation procedure. The card logic may update the blank USIM with the permanent keyset and may switch use of the temporary USIM/keyset to the permanent USIM/keyset 537. According to some exemplary embodiments, the remaining portion of the profile may not be updated or altered. Thereafter, end device 130 may be configured to connect 540 with core network (e.g., core HSS 210) and perform an authentication procedure 542. Although not illustrated, similar to process 200, end device 130 and/or the card logic may perform an activation procedure with OTA 206 before or after authentication procedure 542 based on the enablement of the update.

FIGS. 2-5 illustrate and describe exemplary processes of exemplary embodiments of the third party subscription management of end device profiles service, however according to other exemplary embodiments, the third party subscription management of end device profiles service may include additional, different and/or fewer operations relative to those illustrated and described. The messages illustrated and described are exemplary.

Figure 6:
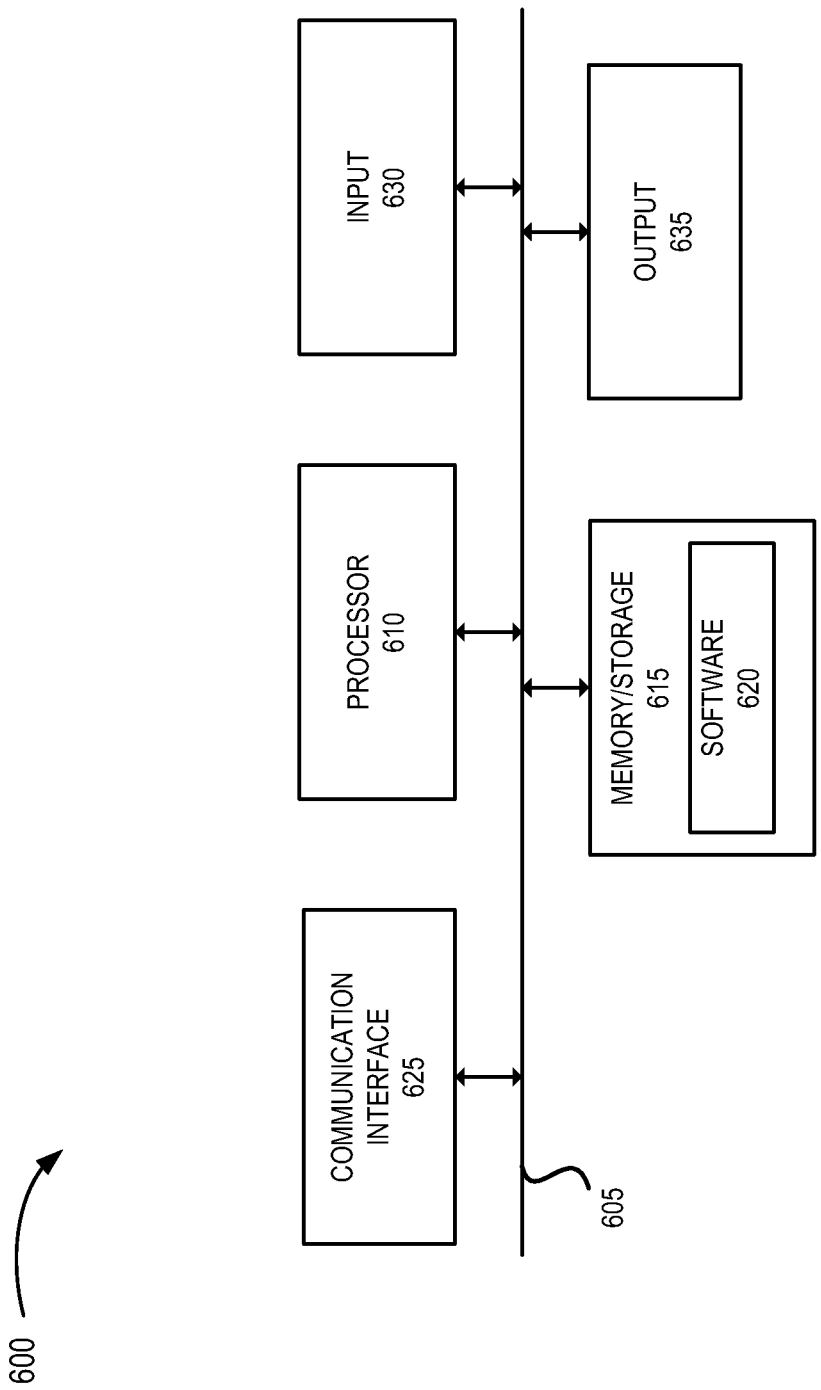
FIG. 6 is a diagram illustrating exemplary components of a device that may correspond to one or more of the devices illustrated and described herein.

FIG. 6 is a diagram illustrating exemplary components of a device 600 that may be included in one or more of the devices described herein. For example, device 600 may correspond to network devices 105, end device 130, allocation device 202, a card, chip, or the like of end device 130, third party subscriber management device 204, OTA device 206, SA HSS 208, core HSS 210, and/or other types of devices, as described herein. As illustrated in FIG. 6, device 600 includes a bus 605, a processor 610, a memory/storage 615 that stores software 620, a communication interface 625, an input 630, and an output 635. According to other embodiments, device 600 may include fewer components, additional components, different components, and/or a different arrangement of components than those illustrated in FIG. 6 and described herein.

Bus 605 includes a path that permits communication among the components of device 600. For example, bus 605 may include a system bus, an address bus, a data bus, and/or a control bus. Bus 605 may also include bus drivers, bus arbiters, bus interfaces, clocks, and so forth.

Processor 610 includes one or multiple processors, microprocessors, data processors, co-processors, graphics processing units (GPUs), application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 610 may be implemented as hardware (e.g., a microprocessor, etc.), a combination of hardware and software (e.g., a SoC, an ASIC, etc.), may include one or multiple memories (e.g., cache, etc.), etc.

Processor 610 may control the overall operation, or a portion of operation(s) performed by device 600. Processor 610 may perform one or multiple operations based on an operating system and/or various applications or computer programs (e.g., software 620). Processor 610 may access instructions from memory/storage 615, from other components of device 600, and/or from a source external to device 600 (e.g., a network, another device, etc.). Processor 610 may perform an operation and/or a process based on various techniques including, for example, multithreading, parallel processing, pipelining, interleaving, learning, model-based, etc.

Memory/storage 615 includes one or multiple memories and/or one or multiple other types of storage mediums. For example, memory/storage 615 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 615 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 615 may be external to and/or removable from device 600, such as, for example, a Universal Serial Bus (USB) memory stick, a dongle, a hard disk, mass storage, off-line storage, or some other type of storing medium. Memory/storage 615 may store data, software, and/or instructions related to the operation of device 600.

Software 620 includes an application or a program that provides a function and/or a process. As an example, with reference to a card or a chip of end device 130, as described herein, software 620 may include an application that, when executed by processor 610, provides a function and/or a process of third party subscription management of end device profiles service, as described herein. Additionally, with reference to OTA device 206, SA HSS 208, and/or core HSS 210, software 620 may include an application that, when executed by processor 610, provides a function and/or a process of third party subscription management of end device profiles service, as described herein. Software 620 may also include firmware, middleware, microcode, hardware description language (HDL), and/or another form of an executable (e.g., applet, script, or the like). Software 620 may also be virtualized. Software 620 may further include an operating system (OS) (e.g., Windows, Linux, Android, proprietary, etc.).

Communication interface 625 permits device 600 to communicate with other devices, networks, systems, and/or the like. Communication interface 625 includes one or multiple wireless interfaces and/or wired interfaces. For example, communication interface 625 may include one or multiple transmitters and receivers, or transceivers. Communication interface 625 may operate according to a protocol stack and a communication standard.

Input 630 permits an input into device 600. For example, input 630 may include a keyboard, a mouse, a display, a touchscreen, a touchless screen, a button, a switch, an input port, a joystick, speech recognition logic, and/or some other type of visual, auditory, tactile, affective, olfactory, etc., input component. Output 635 permits an output from device 600. For example, output 635 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 600 may be implemented in the same manner. For example, device 600 may be instantiated, created, deleted, or some other operational state during its life-cycle (e.g., refreshed, paused, suspended, rebooting, or another type of state or status), using well-known virtualization technologies. For example, network devices 105 and/or end device 130, as described herein, may be a virtualized device.

Device 600 may perform a process and/or a function, as described herein, in response to processor 610 executing software 620 stored by memory/storage 615. By way of example, instructions may be read into memory/storage 615 from another memory/storage 615 (not shown) or read from another device (not shown) via communication interface 625. The instructions stored by memory/storage 615 cause processor 610 to perform a function or a process described herein. Alternatively, for example, according to other implementations, device 600 performs a function or a process described herein based on the execution of hardware (processor 610, etc.).

Figure 7:
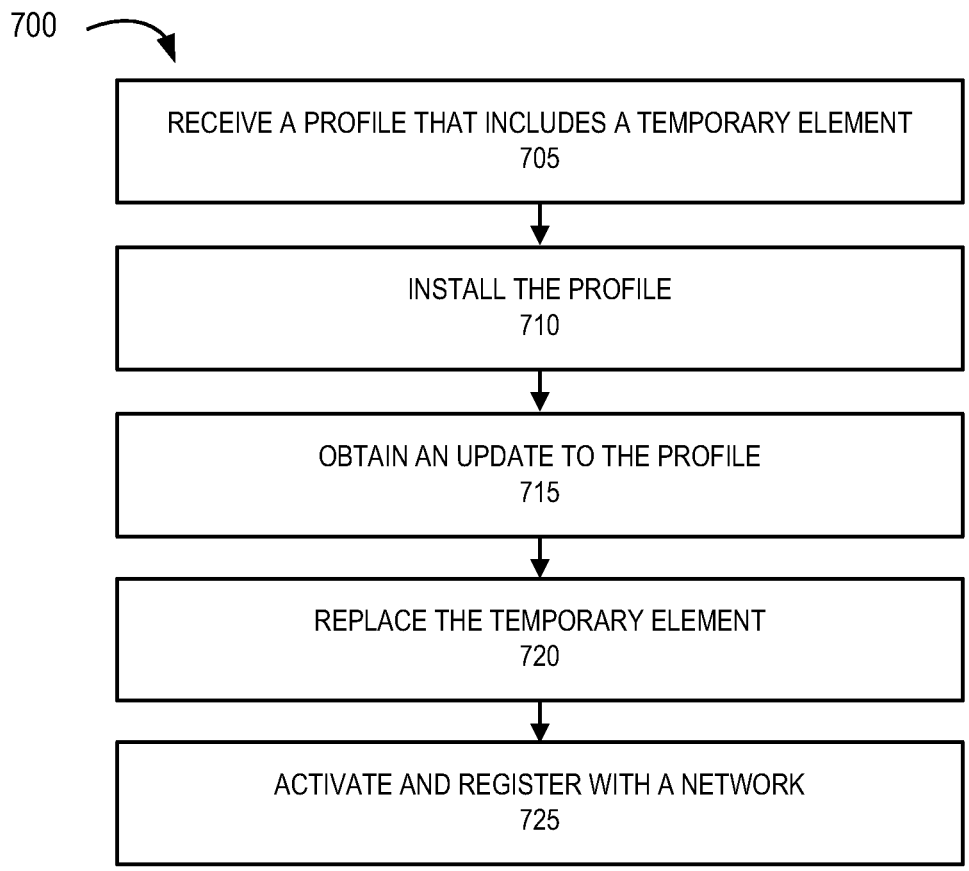
FIG. 7 is a flow diagram illustrating yet another exemplary process of an exemplary embodiment of the third party subscription management of end device profiles service.

FIG. 7 is a flow diagram illustrating an exemplary process 700 of an exemplary embodiment of the third party subscription management of end device profiles service. According to an exemplary embodiment, end device 130 and/or card logic may perform a step of process 700. According to an exemplary implementation, processor 610 executes software 620 to perform the step of process 700, as described herein. Alternatively, the step may be performed by execution of only hardware.

Referring to FIG. 7, in block 705, end device 130 may obtain a profile that includes a temporary element. For example, according to various exemplary embodiments, the profile may include a temporary keyset, a temporary USIM, or a temporary USIM and a blank USIM, as described herein. As described herein, the profile includes other elements, such as subscription management information, and so forth. End device 130 obtains the profile from a third party device, such as a third party subscription management device 204.

In block 710, the card logic of end device 130, as described herein, may install or enable the profile. In block 715, the card logic may obtain an update to the profile. For example, according to various exemplary embodiments, the update may include a permanent keyset, a permanent USIM and a permanent keyset, or a permanent keyset for a blank USIM. As described herein, end device 130 and/or the card logic may have to successfully perform a security measure before obtaining the update. Additionally, end device 130 and/or the card logic may have limited connectivity based on an activation and/or initial registration procedures associated with the network.

In block 720, the card logic may replace the temporary element. For example, according to various exemplary embodiments, the card logic may update the temporary keyset with the permanent keyset, or disable the temporary keyset and enable the permanent keyset. The card logic may refresh an application (e.g., a USIM) and/or other data residing on the card or chip, switch the use of a temporary USIM to a permanent USIM, or switch the use of a temporary USIM to a converted blank USIM (i.e., a permanent USIM) and associated permanent keyset, as described herein.

In block 725, the card logic may be activated and register with a network. For example, the card logic via end device 130 may be activated or register with network 102, which may include a core network.

FIG. 7 illustrates an exemplary embodiment of a process of the third party subscription management of end device profiles service, according to other exemplary embodiments, the third party subscription management of end device profiles service may perform additional operations, fewer operations, and/or different operations than those illustrated and described. For example, the card logic may delete any temporary element of the profile after successfully installing or enabling a permanent element of the profile and/or after completion of an activation procedure, as described herein. According to another example, the third party subscription management of end device profiles service may be implemented to upgrade the end device profile. For example, process 700 and/or another process, as described herein, may use temporary and permanent elements to upgrade a key (e.g., of higher key length), an encryption and/or decryption algorithm (e.g., quantum-proof algorithm or another type of algorithm that may be stronger than a currently used algorithm), and/or another component of the end device profile.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks have been described regarding the process illustrated in FIG. 7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 610, etc.), or a combination of hardware and software (e.g., software 620).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 610) of a device. A non-transitory storage medium includes one or more of the storage mediums described in relation to memory/storage 615. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:
    installing, by a card of an end device, a profile obtained from a third party device, wherein the profile includes a temporary element including a temporary keyset, a temporary Universal Subscriber Identity Module (USIM), or a temporary USIM and a blank USIM, wherein the blank USIM does not include a keyset;
    obtaining, by the card based on the installing and during an initial connectivity with a core network, an update to the profile, wherein the update includes a permanent element configured to replace the temporary element;
    updating, by the card in response to the obtaining of the update, the profile with the permanent element; and
    registering, by the card in response to the updating, the end device with the core network.

2. The method of claim 1, further comprising:
    performing, by the card, an activation procedure using the permanent element.

3. The method of claim 1, further comprising:
    deleting, by the card after the updating, the temporary element.

4. The method of claim 3, wherein the permanent element is a permanent keyset, and the updating comprises:
    converting, by the card, the blank USIM to a permanent USIM with the permanent keyset; and
    switching, by the card, use of the temporary USIM and temporary keyset to the permanent USIM and the permanent keyset.

5. The method of claim 1, wherein the permanent element is a permanent keyset or a permanent Universal Subscriber Identity Module (USIM).

6. The method of claim 1, further comprising:
    authenticating, by the card after the installing, with a core network device of the core network using the profile that includes the temporary element.

7. The method of claim 6, wherein the obtaining further comprises:
    establishing, by the card after successful authentication with the core network device, a connection with a server device; and
    receiving, by the card from the server device, the update to the profile.

8. The method of claim 1, wherein the card includes a Subscriber Identity Module (SIM) card or a Universal Integrated Circuit Card (UICC).

9. A device comprising:
a processor configured to:
install a profile obtained from a third party device, wherein the profile includes a temporary element, wherein the device is a card of an end device and the temporary element includes a temporary keyset, a temporary Universal Subscriber Identity Module (USIM), or a temporary USIM and a blank USIM, wherein the blank USIM does not include a keyset;
obtain, based on an installation of the profile and during an initial connectivity with a core network, an update to the profile, wherein the update includes a permanent element configured to replace the temporary element;
update, in response to an obtainment of the update, the profile with the permanent element; and
register, in response to the update, the end device with the core network.

10. The device of claim 9, wherein the processor is further configured to:
perform an activation procedure using the permanent element.

11. The device of claim 9, wherein the processor is further configured to:
delete, after the updating, the temporary element.

12. The device of claim 9, wherein the permanent element is a permanent keyset, and wherein to update, the processor is further configured to:
convert the blank USIM to a permanent USIM with the permanent keyset; and
switch use of the temporary USIM and temporary keyset to the permanent USIM and the permanent keyset.

13. The device of claim 9, wherein the permanent element is a permanent keyset or a permanent Universal Subscriber Identity Module (USIM).

14. The device of claim 9, wherein the processor is further configured to:
authenticate, after an installment of the profile, with a core network device of the core network using the profile that includes the temporary element.

15. The device of claim 14, wherein to obtain, the processor is further configured to:
establish, after successful authentication with the core network device, a connection with a server device; and
receive, from the server device, the update to the profile.

16. The device of claim 9, wherein the card includes a Subscriber Identity Module (SIM) card or a Universal Integrated Circuit Card (UICC).

17. A non-transitory computer-readable storage medium storing instructions executable by a processor of a card of an end device, wherein the instructions are configured to:
install a profile obtained from a third party device, wherein the profile includes a temporary element, wherein the temporary element includes a temporary keyset, a temporary Universal Subscriber Identity Module (USIM), or a temporary USIM and a blank USIM, wherein the blank USIM does not include a keyset;
obtain, based on an installation of the profile and during an initial connectivity with a core network, an update to the profile, wherein the update includes a permanent element configured to replace the temporary element;
update, in response to an obtainment of the update, the profile with the permanent element; and
register, in response to the update, the end device with the core network.

18. The non-transitory computer-readable storage medium of claim 17, wherein the permanent element is a permanent keyset or a permanent Universal Subscriber Identity Module (USIM).

19. The non-transitory computer-readable storage medium of claim 17, wherein the instructions are further configured to:
delete, after the updating, the temporary element.

20. The non-transitory computer-readable storage medium of claim 17, wherein the card includes a Subscriber Identity Module (SIM) card or a Universal Integrated Circuit Card (UICC).

* * * * *